(12) United States Patent
Shin

(10) Patent No.: US 11,511,623 B2
(45) Date of Patent: Nov. 29, 2022

(54) POWER TRANSMISSION DEVICE AND VEHICLE INCLUDING THE SAME

(71) Applicant: HYUNDAI MOBIS Co., Ltd., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/136,591

(22) Filed: Dec. 29, 2020

(65) Prior Publication Data

US 2022/0024301 A1  Jan. 27, 2022

(30) Foreign Application Priority Data

Jul. 27, 2020 (KR) .................. 10-2020-0093327

(51) Int. Cl.
| | |
|---|---|
| *B60K 17/04* | (2006.01) |
| *B60K 17/02* | (2006.01) |
| *B60K 17/14* | (2006.01) |
| *B60K 17/26* | (2006.01) |

(52) U.S. Cl.
CPC ............ *B60K 17/046* (2013.01); *B60K 17/02* (2013.01); *B60K 17/145* (2013.01); *B60K 17/26* (2013.01)

(58) Field of Classification Search
CPC ...... B60K 17/02; B60K 17/046; B60K 17/26; B60K 17/145; B60K 7/0007; F16H 3/48
See application file for complete search history.

(56) References Cited

U.S. PATENT DOCUMENTS

| | | | |
|---|---|---|---|
| 5,163,528 A | | 11/1992 | Kawamoto et al. |
| 6,334,498 B1 | * | 1/2002 | Morisawa ............ B60W 10/08 180/65.25 |
| 9,636,999 B2 | * | 5/2017 | Shin ..................... B60K 17/046 |
| 9,677,646 B2 | * | 6/2017 | Kasuya .................. B60L 50/16 |
| 10,281,006 B2 | * | 5/2019 | Hirano .................... F16H 37/02 |
| 10,759,268 B2 | | 9/2020 | Mehlis et al. |
| 2012/0053769 A1 | * | 3/2012 | Kumazaki ....... B60W 30/18127 701/22 |
| 2013/0267365 A1 | * | 10/2013 | Gunji .................. B60K 7/0007 475/5 |
| 2015/0111682 A1 | | 4/2015 | Park et al. |
| 2016/0245373 A1 | * | 8/2016 | Kasuya .................... B60K 6/40 |
| 2016/0263984 A1 | * | 9/2016 | Kasuya .................... B60K 6/44 |

(Continued)

FOREIGN PATENT DOCUMENTS

| | | |
|---|---|---|
| DE | 4120262 | 5/1992 |
| DE | 102015203194 | 8/2016 |

(Continued)

*Primary Examiner* — Tinh Dang
(74) *Attorney, Agent, or Firm* — H.C. Park & Associates, PLC

(57) ABSTRACT

A power train for a vehicle, the power train includes: a motor including a rotatable shaft; a reducer coupled to the motor; a gear train disposed at least partially inside the reducer, to transmit rotational force generated by the motor; and a wheel rotatable by receiving power from the reducer or by transmitting power generated by its rotation to the reducer, wherein the gear train is configured to transmit power from the motor to the reducer or to transmit power from the reducer to the motor based upon comparison of a rotational angular velocity of the rotatable shaft and a rotational angular velocity of the reducer.

12 Claims, 6 Drawing Sheets

(56) References Cited

U.S. PATENT DOCUMENTS

| | | | |
|---|---|---|---|
| 2018/0010668 A1* | 1/2018 | Hirano | F16H 57/08 |
| 2019/0023128 A1* | 1/2019 | Tesar | B60K 7/0007 |
| 2019/0176609 A1* | 6/2019 | Bando | B60K 6/52 |
| 2020/0198727 A1 | 6/2020 | Deleval et al. | |

FOREIGN PATENT DOCUMENTS

| | | | | |
|---|---|---|---|---|
| DE | 102016222440 | | 12/2017 | |
| GB | 2220178 A | * | 1/1990 | B60K 7/0007 |
| JP | 2011-168160 | | 9/2011 | |
| JP | 2017155917 | | 9/2017 | |
| JP | 2018132176 | | 8/2018 | |
| JP | 2019213254 | | 12/2019 | |
| KR | 1020060108004 | | 4/2011 | |
| KR | 10-2012-0121270 | | 11/2012 | |
| KR | 101428421 | | 8/2014 | |
| KR | 1020160041733 | | 4/2016 | |
| KR | 1020200037008 | | 4/2020 | |

* cited by examiner

POWER TRANSMISSION DEVICE AND VEHICLE INCLUDING THE SAME

CROSS-REFERENCE TO RELATED APPLICATION

This application claims priority from and the benefit of Korean Patent Application No. 10-2020-0093327, filed on Jul. 27, 2020, which is hereby incorporated by reference for all purposes as if set forth herein.

BACKGROUND

Field

Exemplary embodiments of the invention relate generally vehicles and, more particularly, to a power transmission device for a vehicle.

Discussion of the Background

Motors that convert electrical energy into kinetic energy may be applied to various fields and devices and/or apparatuses. For example, the motor may be mounted in a vehicle to produce a vehicle driving force. In particular, as the demand for eco-friendly vehicles to solve environmental pollution problems of existing internal combustion engines is increasing, the demand for motors mounted in the vehicles is also increasing rapidly.

In order to drive the vehicle using the motor, the rotational speed of a rotating shaft provided in the motor should be reduced and transmitted to the wheel, so it is common to have a separate reducer between the motor and the wheel.

The above information disclosed in this Background section is only for enhancement of understanding of the background of the invention and, therefore, it may contain information that does not constitute prior art.

SUMMARY

Applicants realized that the narrow interior space of the wheel in the related art makes it difficult for the motor and the reducer to be mounted in the wheel. In particular, in order to vary the reduction gear ratio of the reducer according to vehicle driving conditions, a separate clutch is required, which has served as a major obstacle to achieving a compact design for the motor-driven vehicle.

Power transmission devices and vehicles having the same constructed according to the principles and exemplary implementations of the invention can provide variable gear reduction in a motor-driven vehicle and significantly reduce the complexity of the vehicle structure compared to the related art, without eliminating advantages achieved by the related art.

Also, power transmission devices and vehicles having the same constructed according to the principles and exemplary implementations of the invention can increase the reduction gear ratio in a low-speed section of the vehicle to thereby improve driving performance, and reduce the gear reduction ratio when a wheel rotates a motor in a high-speed section of the vehicle to thereby suppress an increase in the rotational speed of a rotating shaft of the motor and effectively protect the motor.

Additional features of the inventive concepts will be set forth in the description which follows, and in part will be apparent from the description, or may be learned by practice of the inventive concepts.

According to one aspect of the invention, a power train for a vehicle, the power train includes: a motor including a rotatable shaft; a reducer coupled to the motor; a gear train disposed at least partially inside the reducer, to transmit rotational force generated by the motor; and a wheel rotatable by receiving power from the reducer or by transmitting power generated by its rotation to the reducer, wherein the gear train is configured to transmit power from the motor to the reducer or to transmit power from the reducer to the motor based upon comparison of a rotational angular velocity of the rotatable shaft and a rotational angular velocity of the reducer.

The reducer may include: a gear engageable with the rotatable shaft of the motor; a plurality of planetary gears engageable the outside of the sun gear; and a carrier engageable with the planetary gears and revolveable with an orbital motion of the planetary gears about the gear, and the gear train may include: a first unidirectional clutch between the rotatable shaft of the motor and the gear; and a second unidirectional clutch between the rotatable shaft of the motor and the carrier.

When the rotational angular velocity of the rotatable shaft of the motor is higher than the rotational angular velocity of the carrier, the first unidirectional clutch may be configured to transmit power generated by rotation of the rotatable shaft of the motor to the gear.

The rotational angular velocity of the rotatable shaft of the motor may be higher than the rotational angular velocity of the carrier, the second unidirectional clutch may be configured to interrupt power transmission between the motor and the carrier.

When the rotational angular velocity of the carrier is higher than the rotational angular velocity of the rotatable shaft of the motor, the first unidirectional clutch may be configured to interrupt power transmission between the gear and the motor.

When the rotational angular velocity of the carrier is higher than the rotational angular velocity of the rotatable shaft of the motor, the second unidirectional clutch may be configured to transmit power generated by rotation of the carrier to the rotatable shaft of the motor.

The first unidirectional clutch and the second unidirectional clutch may be spaced apart from each other in an axial direction of the power train.

The first unidirectional clutch and the second unidirectional clutch may be spaced apart from each other in a radial direction of the power train.

The second unidirectional clutch may symmetrically face a wheel-facing side of the first unidirectional clutch in the axial direction.

The first unidirectional clutch and the second unidirectional clutch may have substantially the same outer diameter.

An outer diameter of the first unidirectional clutch may be larger than an outer diameter of the second unidirectional clutch.

The power train may include a power transmission device, the gear train may include a power transmission unit, the gear may include a sun gear, and the carrier may include: a carrier body forming at least part of the carrier; and a carrier head coupled to a side of the carrier body, and having an outer diameter smaller than that of the carrier body, the first unidirectional clutch at least partially disposed in the carrier body, and the second unidirectional clutch at least partially disposed in the carrier head.

According to another aspect of the invention, a vehicle having a power train, the power train includes: a motor including a rotatable shaft; a reducer coupled to the motor; a gear train disposed at least partially in the reducer to transmit a rotational force generated by driving of the motor to the reducer and to transmit a rotational force generated by driving of the reducer to the motor; and a wheel rotatable by receiving power from the reducer or transmitting power generated by its rotation to the reducer, and the gear train being configured to transmit power from the motor to the reducer or to transmit power from the reducer to the motor by comparing quantities of a rotational angular velocity of the rotatable shaft of the motor and a rotational angular velocity of the reducer.

The power train may include a power transmission device, the gear train may include a power transmission unit, the gear may include a sun gear, and the reducer may include: a gear to engage the rotatable shaft of the motor; a plurality of planetary gears to engage an outside of the gear; and a carrier to engage with the planetary gears and to revolve with an orbital motion of the planetary gears with respect to the gear, and the gear train may include: a first unidirectional clutch between the rotatable shaft of the motor and the sun gear; and a second unidirectional clutch between the rotatable shaft of the motor and the carrier.

When the motor rotates the wheel, the first unidirectional clutch may be configured to transmit power generated by rotation of the rotatable shaft of the motor to the sun gear.

When the motor is rotates the wheel, the second unidirectional clutch may be configured to interrupt power transmission between the motor and the carrier.

When the wheel rotates the motor, the first unidirectional clutch may be configured to interrupt power transmission between the gear and the motor.

When the wheel rotates the motor, the second unidirectional clutch may be configured to transmit power generated by rotation of the carrier to the rotatable shaft of the motor.

The first unidirectional clutch and the second unidirectional clutch may be spaced apart from each other in a width direction of the power train, and the motor, the reducer, and the gear train may be at least partially disposed in the wheel.

The first unidirectional clutch and the second unidirectional clutch may be spaced apart from each other in a radial direction of the power train, and the motor, the reducer, and the gear train may be at least partially disposed outside the wheel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
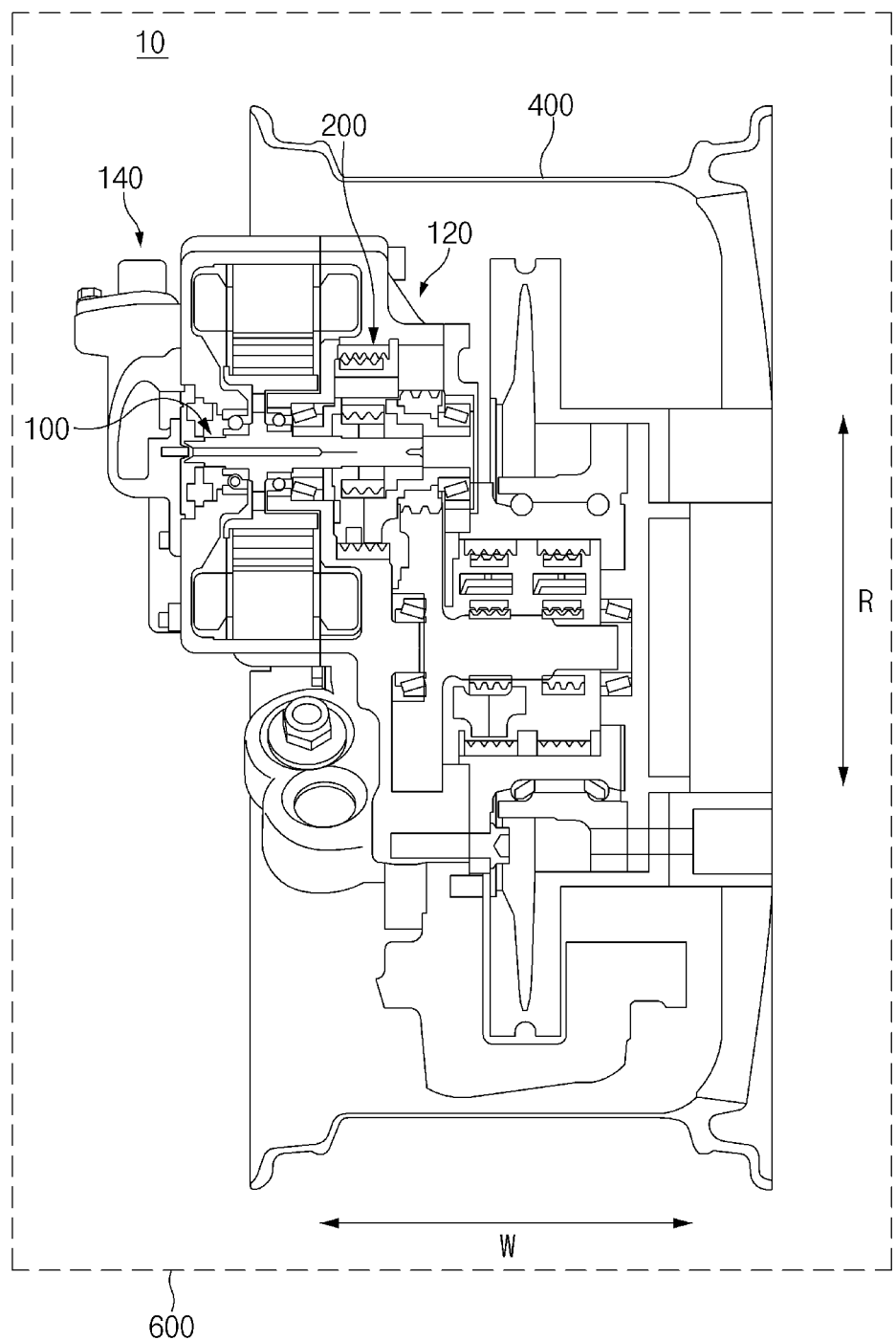
FIG. 1 is a cross-sectional view of an exemplary embodiment of a power transmission device constructed according to principles of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a power transmission device and a vehicle including the same constructed according to the principles and exemplary embodiments of the invention will be described in detail with reference to the accompanying drawings.

Power Transmission Device for Vehicle

Figure 2:
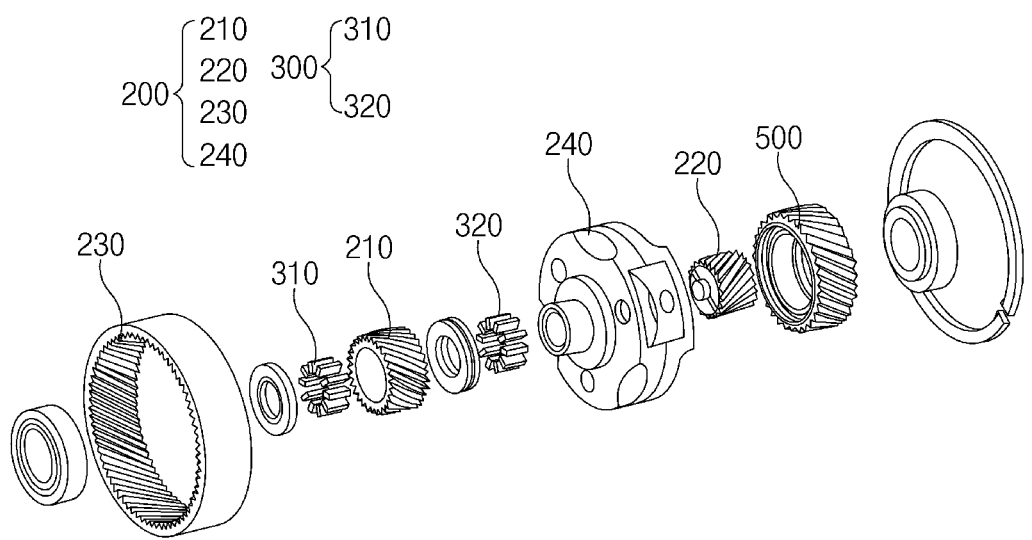
FIG. 2 is an exploded perspective view of the power transmission device of FIG. 1.
Figure 3:
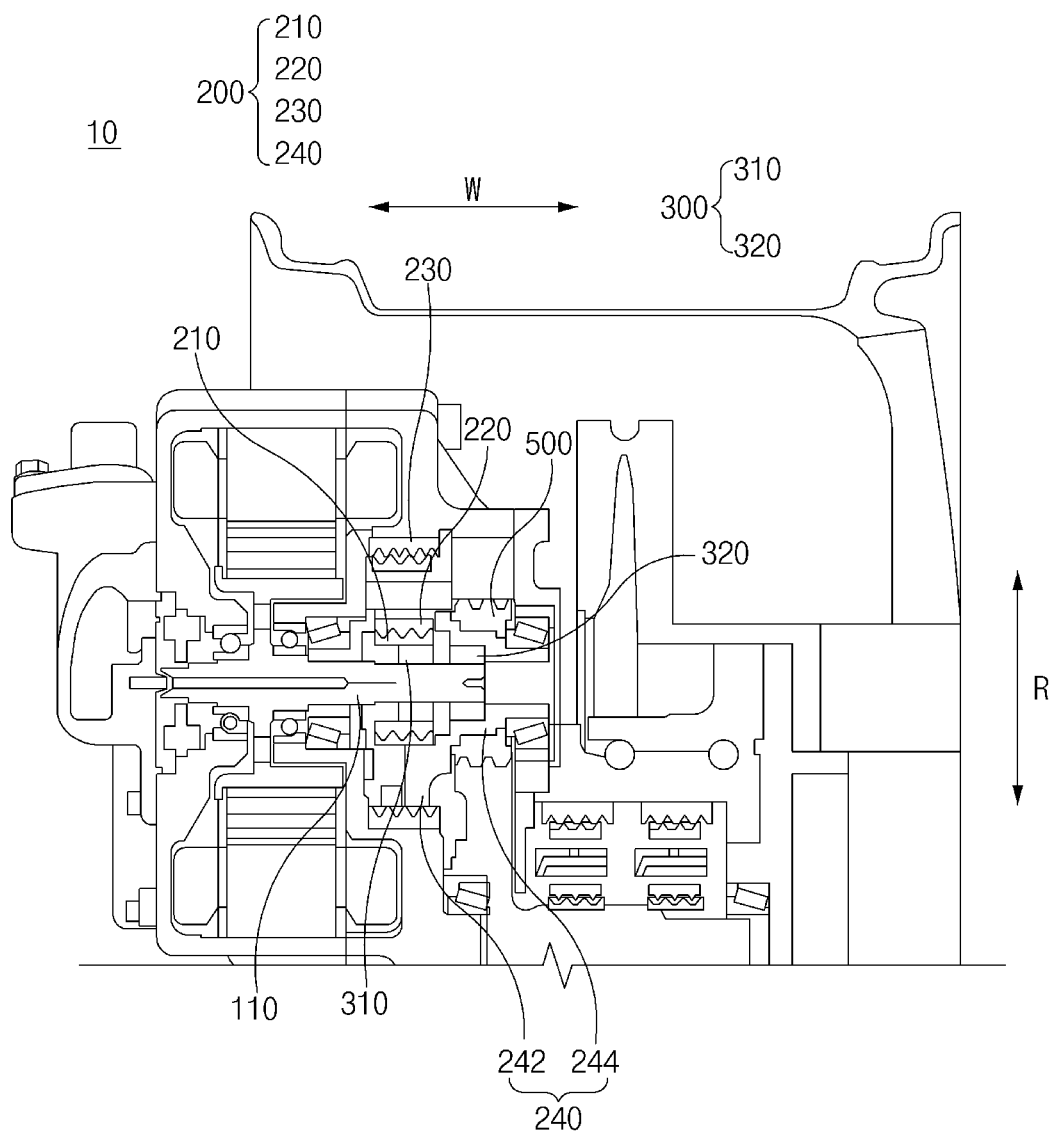
FIG. 3 is an enlarged, cross-sectional view of a coupling structure of a motor, a reducer, and a power transmission unit of the power transmission device of FIG. 1.
Figure 4:
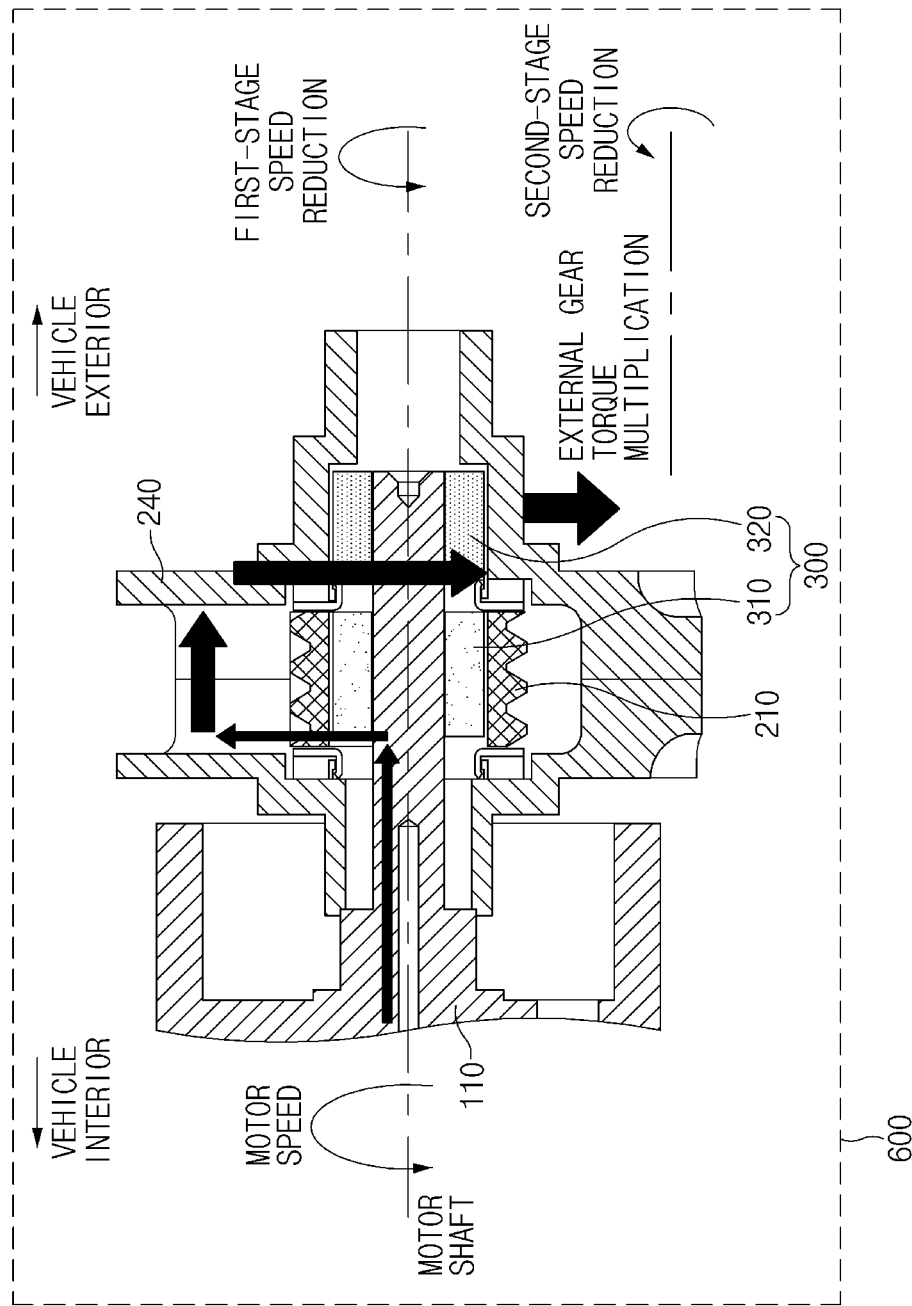
FIG. 4 is a cross-sectional view of an exemplary embodiment of a power transmission mechanism when a rotational angular velocity of a rotating shaft of a motor is higher than that of a carrier in the power transmission device of FIG. 1.
Figure 5:
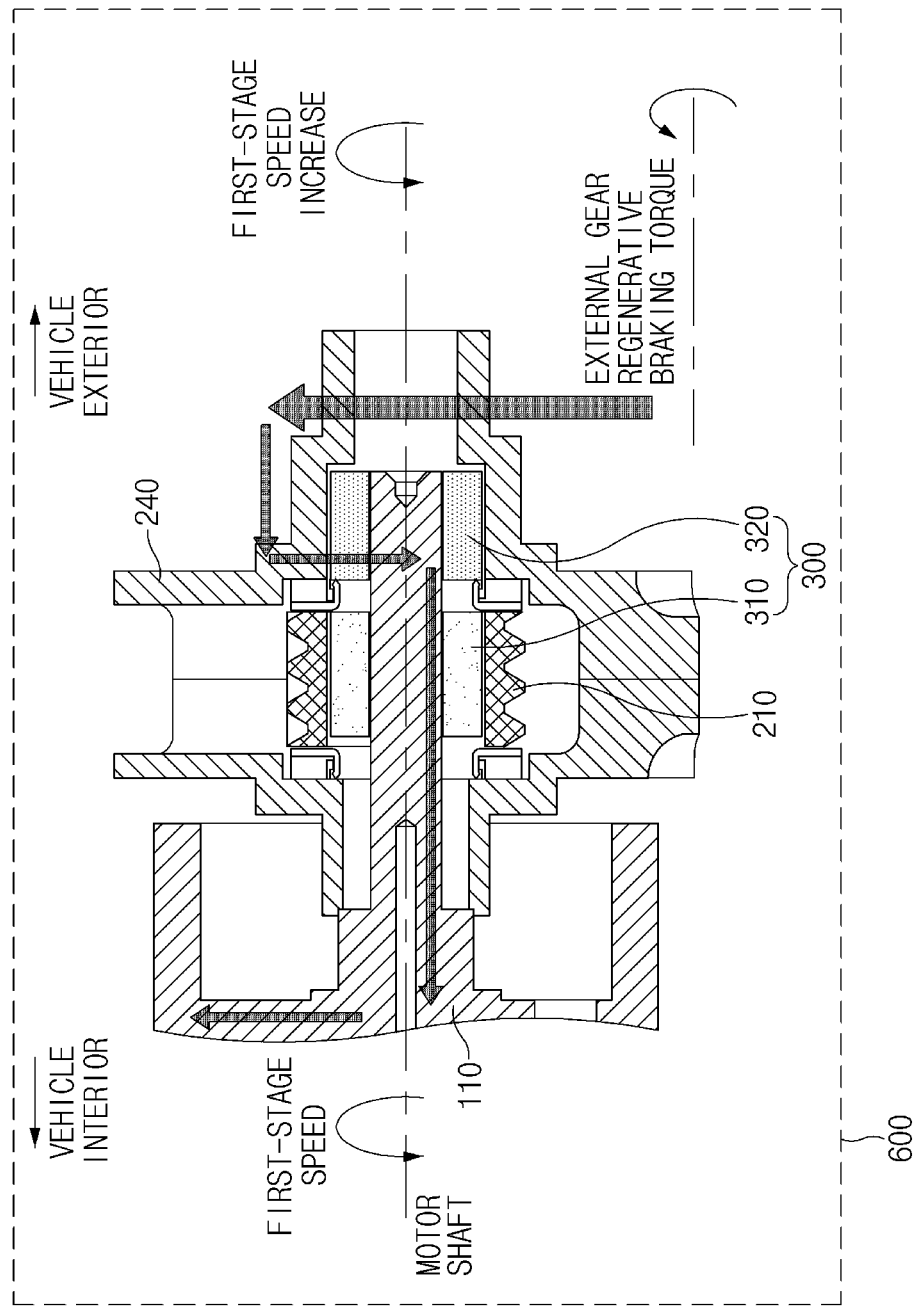
FIG. 5 is a cross-sectional view of an exemplary embodiment of a power transmission mechanism when a rotational angular velocity of a carrier is higher than that of a rotating shaft of a motor in a power transmission device of FIG. 1.
Figure 6:
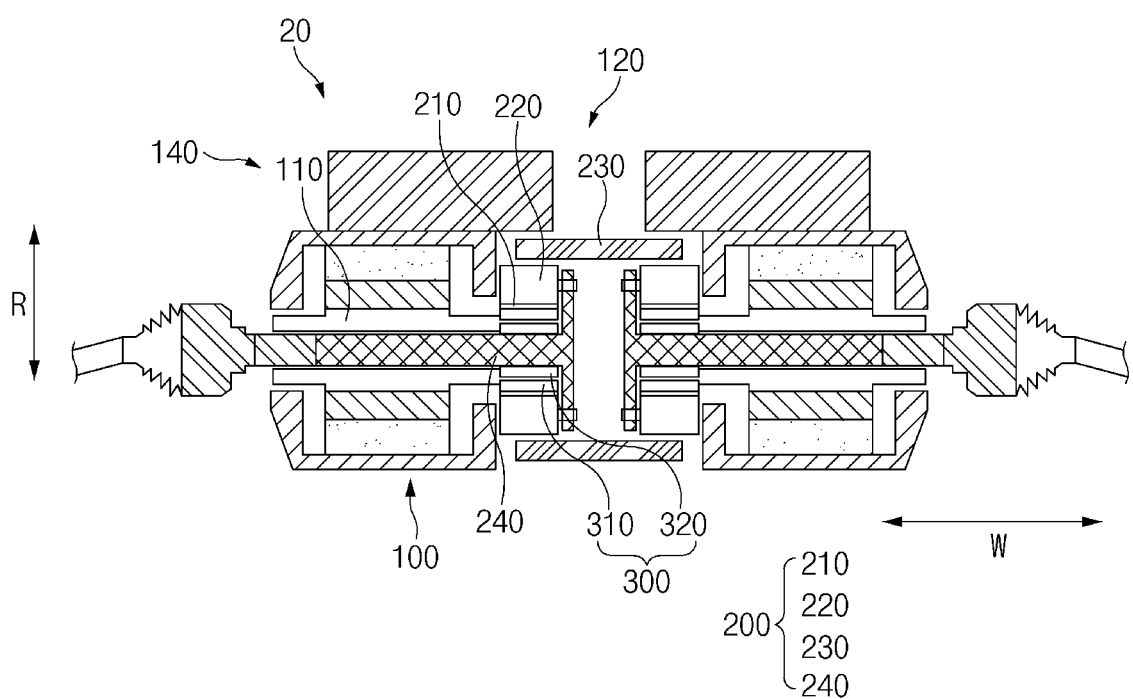
FIG. 6 is a cross-sectional view of another exemplary embodiment of a power transmission device constructed according to principles of the invention.

FIG. 1 is a cross-sectional view of an exemplary embodiment of a power transmission device constructed according to principles of the invention. FIG. 2 is an exploded perspective view of the power transmission device of FIG. 1. FIG. 3 is an enlarged, cross-sectional view of a coupling structure of a motor, a reducer, and a power transmission unit of the power transmission device of FIG. 1. FIG. 4 is a cross-sectional view of an exemplary embodiment of a power transmission mechanism when a rotational angular velocity of a rotating shaft of a motor is higher than that of a carrier in the power transmission device of FIG. 1. FIG. 5 is a cross-sectional view of an exemplary embodiment of a power transmission mechanism when a rotational angular velocity of a carrier is higher than that of a rotating shaft of a motor in a power transmission device of FIG. 1. FIG. 6 is a cross-sectional view of another exemplary embodiment of a power transmission device constructed according to principles of the invention.

Referring to FIGS. 1 to 5, a power train in the form of a power transmission device 10 for a vehicle 600 (shown schematically as a box in FIG. 5) according to some exemplary embodiments may include a motor 100 including a rotatable shaft 110, and a wheel 400 rotatable with power received from the motor 100. The motor 100 may have a first or one side 120 facing the wheel and a second or other side 140 opposing first side 120.

In addition, a reducer 200 may be provided on the wheel side 120 of the motor 100. The reducer 200 may transmit the power of the motor 100 to the wheel 400 after reducing the rotational angular velocity of the rotatable shaft 110 of the motor 100 and increasing torque. Thus, according to some exemplary embodiments, the wheel 400 may receive the power of the motor 100 from the reducer 200 to perform rotational motion. Conversely, the wheel 400 may also transmit power generated by its rotation to the reducer 200.

According to some exemplary embodiments, the reducer 200 may be a planetary gear reducer. That is, as illustrated in FIGS. 1 to 3, the reducer 200 may include a gear in the form of a sun gear 210 engaging with the rotatable shaft 110 of the motor 100, a plurality of planetary gears 220 engaging with the sun gear 210 on the outside of the sun gear 210, a carrier 240 engaging with the planetary gears 220 and rotating (revolving) with the orbital motion of the planetary gears 220 with respect to the sun gear 210, and a ring gear 230 engaging with the planetary gears 220 on the outsides of the planetary gears 220. For example, the carrier 240 may receive the plurality of planetary gears 220 therein, and a surface of the carrier 240 may have through holes, through which the plurality of planetary gears 220 are exposed, respectively. The plurality of planetary gears 220 may engage with portions of the ring gear 230 in which the through holes are formed, respectively.

Referring to FIGS. 1 to 3, the power transmission device 10 may further include a gear train in the form of a power transmission unit 300 transmitting the rotational force of the rotatable shaft 110 generated by the driving of the motor 100 to the reducer 200 (hereinafter, referred to as "the first transmission"), and transmitting the rotational force generated by the driving of the reducer 200 to the motor 100 (hereinafter, referred to as "the second transmission").

According to some exemplary embodiments, the first transmission and the second transmission may be selectively performed or mutually exclusive. For example, the second transmission may not be performed while the first transmission is being performed, and the first transmission may not be performed while the second transmission is being performed.

More specifically, the first transmission and the second transmission may be selectively performed by the power transmission unit 300 depending on comparison of quantities between the rotational angular velocity of the rotatable shaft 110 of the motor 100 and the rotational angular velocity of the reducer 200. That is, the power transmission unit 300 of the power transmission device 10 according to some exemplary embodiments may transmit power from the motor 100 to the reducer 200 or transmit power from the reducer 200 to the motor 100 depending on the comparison of quantities between the angular velocity of the rotatable shaft 110 of the motor 100 and the angular velocity of the reducer 200. An exemplary power transmission mechanism of the power transmission unit 300 will be described below.

As illustrated in FIG. 3, according to some exemplary embodiments, the power transmission unit 300 may include a first unidirectional clutch in the form of a first one-way clutch 310 provided between the rotatable shaft 110 of the motor 100 and the sun gear 210, and a second unidirectional clutch in the form of a one-way clutch 320 provided between the rotatable shaft 110 of the motor 100 and the carrier 240. More specifically, the rotatable shaft 110 of the motor 100 and the sun gear 210 may be spaced apart from each other in a axial direction of the power transmission device 10, and the first one-way clutch 310 may be provided in between the rotatable shaft 110 and the sun gear 210. In addition, the rotatable shaft 110 of the motor 100 and the carrier 240 may also be spaced apart from each other in the radial direction R of the power transmission device 10, and the second one-way clutch 320 may be provided in between the rotatable shaft 110 and the carrier 240. Here, the radial direction R refers to a direction substantially perpendicular to the axial direction in which the rotatable shaft 110 of the motor 100 extends longitudinally.

The one-way clutch 310 allows power transmission in only one direction. That is, the one-way clutch 310 may be used for power transmission between one element and the other element in a manner that enables power transmission from one element to the other element, but interrupts power transmission from the other element to one element. According to exemplary embodiments, various types of one-way clutches may be used. For example, the first one-way clutch 310 and the second one-way clutch 320 may be a sprag clutch.

Referring to FIGS. 1 to 3, according to some exemplary embodiments, the first one-way clutch 310 and the second one-way clutch 320 may be spaced apart from each other in a longitudinal axial (width) direction W of the power transmission device 10. Here, the width direction W refers to a direction substantially parallel to the axial direction in which the rotatable shaft 110 of the motor 100 extends.

More specifically, the second one-way clutch 320 may symmetrically face one side (wheel-facing side) 120 of the first one-way clutch 310 in the width direction W. The second one-way clutch 320 may symmetrically face the other side 140 (motor-facing side) of the first one-way clutch 310 opposing one side of the first one-way clutch 310 in the width direction W. In FIGS. 1 and 3, the second one-way clutch 320 is illustrated as facing the wheel (right) side of the first one-way clutch 310.

In addition, the first one-way clutch 310 and the second one-way clutch 320 may have substantially the same outer diameter. Alternatively, the first one-way clutch 310 and the second one-way clutch 320 may have substantially the same compatible structure. In this case, it is not required to manufacture two types of one-way clutches in order to manufacture the power transmission device 10, which is advantageous to productivity and manufacturing cost.

As illustrated in FIG. 3, the carrier 240 of the reducer 200 provided in the power transmission device 10 may include a carrier body in the form a carrier body portion 242 forming a body of the carrier 240, and a carrier head in the form of a carrier head portion 244 provided on one side of the carrier body portion 242 and having an outer diameter substantially smaller than that of the carrier body portion 242. Here, the distance between the carrier body portion 242 and the motor 100 may be less than the distance between the carrier head portion 244 and the motor 100. In FIGS. 1 and 3, the carrier body portion 242 may be provided on the left side, and the carrier head portion 244 may be provided on the right side.

According to some exemplary embodiments, the first one-way clutch 310 may be provided in the carrier body portion 242, and the second one-way clutch 320 may be provided in the carrier head portion 244.

As illustrated in FIGS. 2 and 3, the power transmission device 10 may further include an external gear 500 provided on the outside of the carrier 240. The external gear 500 may reduce the rotational force of the motor 100, which has been reduced by the reducer 200, once more to increase torque, and then transmit it to the wheel 400. More specifically, the external gear 500 may engage with the carrier head portion 244 on the outside of the carrier head portion 244.

Hereinafter, the power transmission mechanisms of the power transmission device 10 according to exemplary embodiments will be detailed.

When a rotational angular velocity of the rotatable shaft 110 of the motor 100 is higher than the rotational angular velocity of the carrier 240 (that is, orbital angular velocity of the planetary gears 220), the first one-way clutch 310 may transmit power generated by the rotation of the rotatable shaft 110 of the motor 100 to the sun gear 210 while the second one-way clutch 320 may interrupt power transmission between the motor 100 and the carrier 240. In this case, as illustrated in FIG. 4, when the rotational angular velocity of the rotatable shaft 110 of the motor 100 transmitted to the sun gear 210 is reduced through the planetary gears 220 and the carrier 240 and torque is increased, the rotational force of the carrier 240 may be transmitted to the wheel 400 (see FIGS. 1 and 3). In FIG. 4, the power transmission path is illustrated by arrows, and the change in the magnitude of torque according to the power transmission path can be seen by the change in relative thicknesses of the arrows. Here, the magnitude of the torque and the magnitude of the angular velocity may be inversely proportional to each other.

When the rotational angular velocity of the carrier 240 is higher than the rotational angular velocity of the rotatable shaft 110 of the motor 100, the first one-way clutch 310 may interrupt power transmission between the sun gear 210 and the motor 100 while the second one-way clutch 320 may transmit power generated by the rotation of the carrier 240 to the rotatable shaft 110 of the motor 100. In FIG. 5, the power transmission path is illustrated by arrows, and the change in the magnitude of torque according to the power transmission path can be seen by the change in relative thicknesses of the arrows.

The above-described power transmission mechanisms are based on the comparison of quantities between the rotational angular velocity of the rotatable shaft 110 of the motor 100 and the rotational angular velocity of the carrier 240, but may also be described in view of the driving of the motor 100 to rotate the wheel 400, or braking of the wheel 400.

That is, referring to FIG. 4, when the motor 100 is driven to rotate the wheel 400, the first one-way clutch 310 may transmit the power generated by the rotation of the rotatable shaft 110 of the motor 100 to the sun gear 210, but the second one-way clutch 320 may interrupt the power transmission between the motor 100 and the carrier 240.

On the other hand, referring to FIG. 5, when the wheel 400 rotates the motor 100, the first one-way clutch 310 may interrupt the power transmission between the sun gear 210 and the motor 100, but the second one-way clutch 320 may transmit the power generated by the rotation of the carrier 240 received from the rotation of the wheel 400 to the rotatable shaft 110 of the motor 100.

When the motor 100 is driven to rotate the wheel 400, the rotational force of the motor 100 is transmitted to the wheel 400 through the reducer 200. Even in this case, however, because the rotational force is transmitted to the wheel 400 in a state in which the rotational angular velocity of the rotatable shaft 110 of the motor 100 is reduced and the torque is increased, the power generated by the motor 100 may be transmitted to the wheel 400 through the first one-way clutch 310, the sun gear 210, the planetary gears 220, and the carrier 240. On the other hand, when the power generated by the motor 100 is transmitted to the wheel 400 through the second one-way clutch 320 and the carrier 240, the rotational angular velocity of the rotating shaft of the motor 100 may not be reduced, and thus the second one-way clutch 320 may interrupt the power transmission between the motor 100 and the carrier 240.

Conversely, when the wheel 400 rotates at high speed by receiving additional power, the rotational force of the wheel 400 may be transmitted to the motor through the reducer 200. Here, when the rotational force of the wheel 400 is transmitted to the rotatable shaft 110 of the motor 100 through the carrier 240, the planetary gears 220, the sun gear 210, and the first one-way clutch 310, the rotational force of the wheel 400 may be transmitted to the carrier 240, and then be transmitted to the rotatable shaft 110 of the motor 100 in a state in which the rotational angular velocity is increased in the reducer 200. In this case, the rotational speed of the rotatable shaft 110 of the motor 100 may excessively increase, which can cause a problem in durability of the motor 100 including the rotatable shaft 110. Thus, when the vehicle 600 drives at high speed, it is not desirable that the rotational force of the wheel 400 is transmitted to the motor 100 through the same power transmission path as in the case of increasing the rotational angular velocity of the wheel 400 by the driving of the motor 100.

According to some exemplary embodiments, in order to transmit the rotational force of the wheel 400 to the rotatable shaft 110 of the motor 100 in a state in which the rotational angular velocity of the wheel 400 is not increased in the reducer 200, the rotational force of the wheel 400 may be transmitted to the rotatable shaft 110 of the motor 100 through the carrier 240 and the second one-way clutch 320. In this case, the rotational angular velocity may not increase after the rotational force of the wheel 400 is transmitted to the carrier 240. That is, because the carrier 240 and the rotatable shaft 110 of the motor 100 are directly connected through the second one-way clutch 320, the rotational angular velocity of the carrier 240 and the rotational angular velocity of the rotatable shaft 110 of the motor 100 may be substantially the same. Thus, when the wheel 400 rotates at high speed, the rotational angular velocity of the motor 100 may be significantly reduced, which has an advantageous effect on the durability of the motor 100.

Referring to FIG. 6, similar to the above-described exemplary embodiment, the power transmission device 20 according to another exemplary embodiment may also include the motor 100 including the rotatable shaft 110, the reducer 200 provided on one side 120 of the motor 100, the power transmission unit 300 provided inside the reducer 200, and the wheel 400. In addition, the reducer 200 may include the sun gear 210, the plurality of planetary gears 220, the ring gear 230, and the carrier 240, and the power transmission unit 300 may include the first one-way clutch 310 provided between the rotatable shaft 110 of the motor 100 and the sun gear 210, and the second one-way clutch 320 provided between the rotatable shaft 110 of the motor 100 and the carrier 240. Hereinafter, the power transmission device 20 according to this exemplary embodiment will be described by focusing on differences from the power transmission device 10 according to the previous exemplary embodiment.

According to another exemplary embodiment, the sun gear 210 may be spaced outward from the rotatable shaft 110 in the radial direction R of the power transmission device 10. At least a portion of the rotatable shaft 110 may be provided inside the sun gear 210.

In addition, according to another exemplary embodiment, the carrier 240 may be spaced inward from the rotatable shaft 110 in the radial direction R of the power transmission device 10. Accordingly, at least a portion of the carrier 240 may be provided inside the rotatable shaft 110.

The first one-way clutch 310 and the second one-way clutch 320 in the power transmission device 10 according to another exemplary embodiment may be spaced apart from each other in the radial direction R of the power transmission device 10. Thus, unlike the power transmission device 10 according to the previous exemplary embodiment, the first one-way clutch 310 and the second one-way clutch 320 may have different outer diameters. More specifically, as illustrated in FIG. 6, the outer diameter of the first one-way clutch 310 may be larger than the outer diameter of the second one-way clutch 320. Because the first one-way clutch 310 is provided between the rotatable shaft 110 and the sun gear 210 and the second one-way clutch 320 is provided between the rotatable shaft 110 and the carrier 240, the outer diameter of the sun gear 210 is larger than the outer diameter of the carrier 240 in an area of the power transmission unit 300 in which the first one-way clutch 310 and the second one-way clutch 320 are provided. As illustrated in FIG. 6, the first one-way clutch 310 and the second one-way clutch 320 may have substantially the same width, and the first one-way clutch 310 and the second one-way clutch 320 may overlap each other in the width direction W of the power transmission device 20. In this case, the volume occupied by the first one-way clutch 310 and the second one-way clutch 320 in the power transmission device 20 may be minimized.

Vehicle

Referring to FIGS. 1 to 6, a vehicle according to some exemplary embodiments may include the power transmission device 10 or 20. The power transmission device 10 or 20 may include: the motor 100 including the rotatable shaft 110; the reducer 200 provided on one side 120 of the motor 100; the power transmission unit 300 provided inside the reducer 200, transmitting a rotational force generated by the driving of the motor 100 to the reducer 200, and transmitting a rotational force generated by the driving of the reducer 200 to the motor 100; and the wheel 400 rotating by receiving power from the reducer 200 or transmitting power generated by its rotation to the reducer 200.

According to some exemplary embodiments, the power transmission unit 300 may selectively transmit power from the motor 100 to the reducer 200 or transmit power from the reducer 200 to the motor 100 depending on the comparison of quantities between the rotational angular velocity of the rotatable shaft 110 of the motor 100 and the rotational angular velocity of the reducer 200.

The reducer 200 may include the sun gear 210 engaging with the rotatable shaft 110 of the motor 100, the plurality of planetary gears 220 engaging with the sun gear 210 on the outside of the sun gear 210, and the carrier 240 engaging with the planetary gears 220 and rotating (revolving) with the orbital motion of the planetary gears 220 with respect to the sun gear 210. In addition, the power transmission unit 300 may include the first one-way clutch 310 provided between the rotatable shaft 110 of the motor 100 and the sun gear 210, and the second one-way clutch 320 provided between the rotatable shaft 110 of the motor 100 and the carrier 240.

According to some exemplary embodiments, the first one-way clutch 310 and the second one-way clutch 320 may be spaced apart from each other in the width direction W of the power transmission device 10. In this case, as illustrated in FIG. 1, all of the motor 100, the reducer 200, and the power transmission unit 300 may be provided in the wheel 400.

According to another exemplary embodiment, the first one-way clutch 310 and the second one-way clutch 320 may be spaced apart from each other in the radial direction R of the power transmission device 10. In this case, as illustrated in FIG. 6, the motor 100, the reducer 200, and the power transmission unit 300 may be provided outside the wheel 400.

That is, according to another exemplary embodiment, the wheels may be provided on the left and right sides of the power transmission device illustrated in FIG. 6, respectively. When the wheel provided on the left side is referred to as the left wheel, and the wheel provided on the right side is referred to as the right wheel, all of the motor 100, the reducer 200, and the power transmission unit 300 may be provided between the left wheel and the right wheel. In addition, as illustrated in FIG. 6, the motor 100, the reducer 200, and the power transmission unit 300 connected to the left wheel may be provided separately from the motor 100, the reducer 200, and the power transmission unit 300 connected to the right wheel; and the motor 100, the reducer 200, and the power transmission unit 300 connected to the left wheel and the motor 100, the reducer 200, and the power transmission unit 300 connected to the right wheel may be provided on the same axis. More preferably, (i) the left wheel and the motor 100, the reducer 200, and the power transmission unit 300 connected to the left wheel may be symmetrical to (ii) the right wheel and the motor 100, the reducer 200, and the power transmission unit 300 connected to the right wheel.

According to some exemplary embodiments, when the motor 100 in the vehicle 600 is driven to rotate the wheel 400, the first one-way clutch 310 may transmit power generated by the rotation of the rotatable shaft 110 of the motor 100 to the sun gear 210, and accordingly the power may be transmitted to the wheel 400 in a state in which the angular velocity of the rotatable shaft 110 of the motor 100 is reduced through the planetary gears 220 and the carrier 240. On the other hand, the second one-way clutch 320 may interrupt the power transmission between the motor 100 and the carrier 240, thereby preventing the rotational force of the motor 100 from being directly transmitted to the carrier 240 without the reduction of the angular velocity.

According to some exemplary embodiments, when the wheel 400 of the vehicle 600 rotates the motor 100, the first one-way clutch 310 may interrupt the power transmission between the sun gear 210 and the motor 100. On the other hand, the second one-way clutch 320 may transmit the power generated by the rotation of the carrier 240 to the rotatable shaft 110 of the motor 100. In this case, the power transmission unit 300 may transmit the rotational force of the wheel 400 to the motor 100 in a manner that prevents the rotational angular velocity of the wheel 400 from being increased through the reducer 200, thereby preventing the rotational angular velocity of the rotatable shaft 110 of the motor 100 from excessively increasing.

As set forth above, power transmission devices constructed according to the principles and exemplary embodiments of the invention, provide for variable gear reduction in the motor-driven vehicle 600 and significantly reduce the complexity of the vehicle structure, compared to the related art.

In addition, power transmission devices constructed according to the principles and exemplary embodiments of the invention can increase the reduction gear ratio in a low-speed section of the vehicle 600 to thereby improve driving performance, and reduce the reduction gear ratio when the wheel 400 rotates the motor 100 in a high-speed section of the vehicle 600 to thereby suppress an increase in the rotational speed of the rotatable shaft 110 of the motor 100 and effectively protect the motor 100.

What is claimed is:

1. A power train for a vehicle, the power train comprising:
a motor including a rotatable shaft;
a reducer selectively coupled to the rotatable shaft;
a gear train disposed at least partially inside the reducer to transmit rotational force generated by the motor; and
a wheel rotatable by receiving power from the reducer or by transmitting power generated by its rotation to the reducer,
wherein:
when a rotational angular velocity of the rotational shaft is greater than a rotational angular velocity of the reducer, the gear train is configured to transmit power from the motor to the reducer; and when a rotational angular velocity of the reducer is greater than a rotational angular velocity of the rotational shaft, the gear train is configured to transmit power from the rotation of the wheel to the motor through the reducer.

2. The power train according to claim 1, wherein the reducer comprises:
a sun gear engageable with the rotatable shaft of the motor;
a plurality of planetary gears engageable the outside of the sun gear; and
a carrier engageable with the planetary gears and revolvable with an orbital motion of the planetary gears about the sun gear, and
the gear train comprises:
a first unidirectional clutch between the rotatable shaft of the motor and the sun gear; and
a second unidirectional clutch between the rotatable shaft of the motor and the carrier.

3. The power train according to claim 2, wherein when the rotational angular velocity of the rotatable shaft of the motor is higher than the rotational angular velocity of the carrier, the first unidirectional clutch is configured to transmit power generated by rotation of the rotatable shaft of the motor to the sun gear.

4. The power train according to claim 3, wherein when the rotational angular velocity of the rotatable shaft of the motor is higher than the rotational angular velocity of the carrier, the second unidirectional clutch is configured to interrupt power transmission between the motor and the carrier.

5. The power train according to claim 2, wherein when the rotational angular velocity of the carrier is higher than the rotational angular velocity of the rotatable shaft of the motor, the first unidirectional clutch is configured to interrupt power transmission between the sun gear and the motor.

6. The power train according to claim 5, wherein when the rotational angular velocity of the carrier is higher than the rotational angular velocity of the rotatable shaft of the motor, the second unidirectional clutch is configured to transmit power generated by rotation of the carrier to the rotatable shaft of the motor.

7. The power train according to claim 2, wherein the first unidirectional clutch and the second unidirectional clutch are spaced apart from each other in an axial direction of the power train.

8. The power train according to claim 2, wherein the first unidirectional clutch and the second unidirectional clutch are spaced apart from each other in a radial direction of the power train.

9. The power train according to claim 7, wherein the second unidirectional clutch symmetrically faces a wheel-facing side of the first unidirectional clutch in the axial direction.

10. The power train according to claim 9, wherein the first unidirectional clutch and the second unidirectional clutch have substantially the same outer diameter.

11. The power train according to claim 8, wherein an outer diameter of the first unidirectional clutch is larger than an outer diameter of the second unidirectional clutch.

12. The power train according to claim 9, wherein the power train comprises a power transmission device, the gear train comprises a power transmission unit, and the carrier comprises:
a carrier body forming at least part of the carrier; and
a carrier head coupled to a side of the carrier body, and having an outer diameter smaller than that of the carrier body,
the first unidirectional clutch at least partially disposed in the carrier body, and
the second unidirectional clutch at least partially disposed in the carrier head.

* * * * *